May 18, 1926.

R. H. GREEGOR

WINDING AND COUNTERBALANCING MECHANISM FOR CURTAINS

Filed June 27, 1924 2 Sheets-Sheet 1

1,585,191

Inventor
RALPH H. GREEGOR

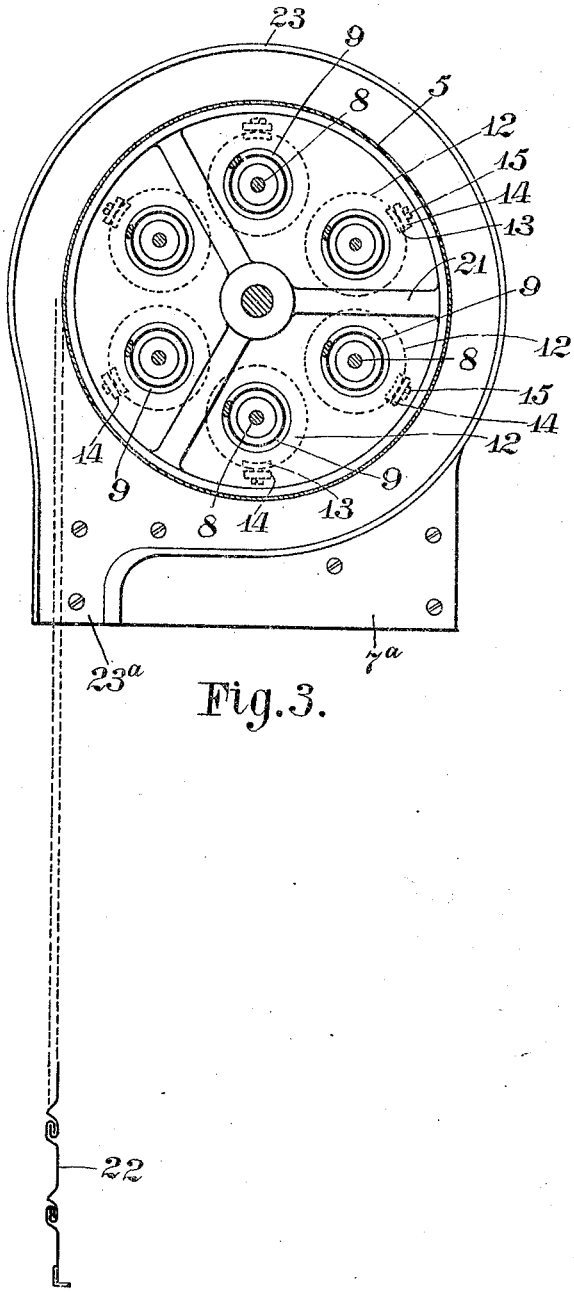

Patented May 18, 1926.

1,585,191

UNITED STATES PATENT OFFICE.

RALPH H. GREEGOR, OF COLUMBUS, OHIO, ASSIGNOR TO THE KINNEAR MANUFACTURING COMPANY, OF COLUMBUS, OHIO, A CORPORATION OF OHIO.

WINDING AND COUNTERBALANCING MECHANISM FOR CURTAINS.

Application filed June 27, 1924. Serial No. 722,669.

The object of the invention is to provide an improved hoisting and counterbalancing means for a door or curtain, especially where the opening to be closed is of unusual height such as is the case, for example, in marine towers for grain elevators. Owing to the horizontal form and dimension of such a tower and opening it is important to compact the hoisting and counterbalancing element as much as possible.

The invention is embodied in the example herein shown and described, the features of novelty being finally claimed.

In the accompanying drawing—

Fig. 3 is a sectional view on the line III—III looking to the right.

Figure 1:
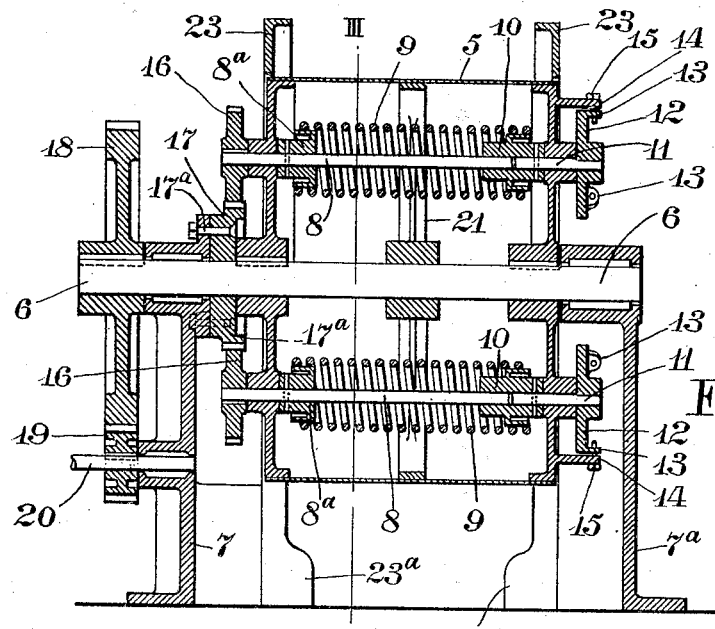
Figure 1 is mainly a vertical sectional view on the line I—I Fig. 2 showing a curtain winding drum equipped with a counterbalancing apparatus according to my invention.
Figure 2:
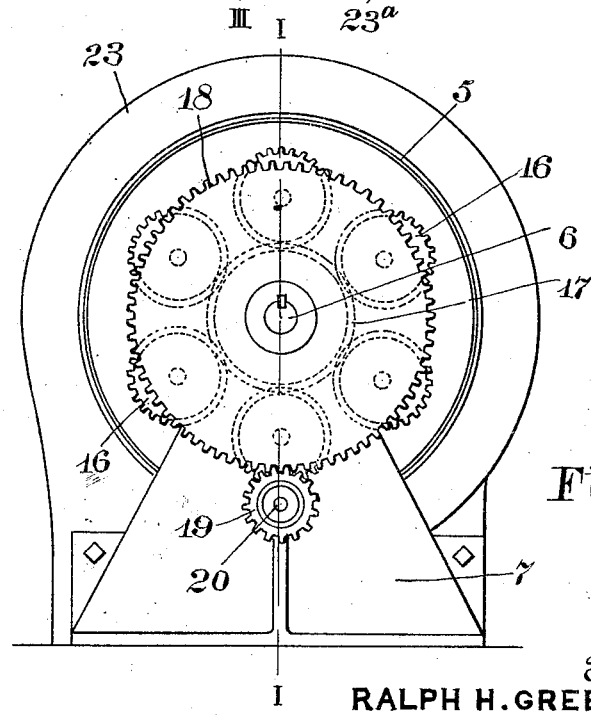
Fig. 2 is an elevation looking toward the left hand side of the apparatus as positioned in Fig. 1.

In the views 5 designates a drum or reel having its two heads keyed on to rotate with a shaft 6 that is suitably journaled in fixed frames 7 and 7ª. Journaled in the left hand head of the drum or reel is a series of shafts 8 each of which has its axis eccentric to the axis of the drum but all of which are arranged in a circle concentric with the shaft 6. Each of said shafts 8 has a collar 8ª fixed thereon to which is attached one end of a coil spring 9 the other end of said spring being attached to a collar 10 pinned on a short shaft 11 journaled in the other head of the drum or reel. The external end of the short shaft 11 is provided with a wheel 12 having on its rim several eyes 13 any one of which can be brought to coincide with an eye on a projection 14 on the head of the drum after which a pin 15 can be inserted through the two to hold the short shaft 11 from rotation with reference to the drum head. By turning the wheel 12 and placing the locking pin 15 in position the tension of the spring can be adjusted or regulated to the initial tension desired.

The outer end of each of the shafts 8 has keyed to it a spur gear 16 meshing with a circular rack or wheel 17 fixed by pins 17ª to the frame member 7.

At its outer or left hand end the driven shaft 6 has affixed thereto a large spur 18 engaged and driven by a small spur gear 19 keyed on a shaft 20 journaled in the frame member 7.

The drum or reel 5 can be braced by an internal spider as shown at 21; and the flexible curtain indicated at 22, Fig. 3, attached to the drum to be wound thereon and unwound therefrom by the operation of the small spur gear 19.

Stationary brackets 23, 23, surrounding the heads of the drum or reel and having guides at 23ª for the edges of the curtain can be provided. The curtain winds on and unwinds from the drum between these brackets.

In operation the turning of the small gear 19 rotates the shaft 6 and the drum or reel 5 thereby causing the planetary revolution of the shafts 8 and the winding or unwinding of the springs 9 according to the direction of the motion given the small gear 19. The connection of the springs with their several shafts is such that in the curtain unwinding movement of the drum or reel the springs are placed under increasing tension as the curtain unwinds from the drum and conversely as the curtain is wound up such tension is correspondingly decreased. The springs can be made of the proper weight and coil and the adjustment of them made proper to suitably counterbalance or partially counterbalance the curtain to the desired extent in the several positions of the unrolled portion of the curtain.

The forms and arrangements of the parts can be changed without departing from the gist of the invention as claimed.

What I claim is:

1. A counterbalancing mechanism for a curtain winding drum having a turning means and a fixed supporting frame, said counterbalancing mechanism including a spur gear mounted on the drum on an axis parallel and eccentric to the axis of the drum, a coil spring within the drum connected at one end with the drum and at its other end to be wound and unwound by said spur gear and means for turning said spur gear when the drum is turned to wind and unwind the spring when the curtain is unwound and wound respectively.

2. A counterbalancing mechanism for a curtain winding drum having a fixed supporting frame and a drum turning means, said counterbalancing mechanism including a spur gear mounted on the drum on an axis parallel and eccentric to the axis of the drum, a coil spring within the drum connected at one end to the drum and at its other end to be wound and unwound by said spur gear and means for turning said spur gear when the drum is turned consisting of a circular rack fixed to the frame and engaged by the spur gear whereby when the drum is turned to wind and unwind the curtain the spring is unwound and wound respectively.

3. A counterbalancing mechanism for a curtain winding drum having a fixed supporting frame and a drum turning means, said counterbalancing mechanism including a plurality of spur gears mounted on the drum on axes parallel to and eccentric to the axis of the drum, a coil spring for each of said spur gears within the drum each connected at one end to be wound and unwound by said spur gear and its other end connected with said drum and means for rotating said spur gear when the drum is turned to wind and unwind said springs when the curtain is unwound and wound respectively.

4. A counterbalancing mechanism for a curtain winding drum having a fixed supporting frame and a drum turning means, said counterbalancing mechanism including a plurality of spur gears mounted on the drum on axes parallel to and eccentric to the axis of the drum, a coil spring for each of said spur gears within the drum each connected at one end to be wound and unwound by said spur gear and its other end connected with said drum and a circular rack fixed on the frame for rotating said spur gears when the drum is turned to wind and unwind said springs when the curtain is unwound and wound respectively.

5. The combination with a curtain and winding member therefor, of a plurality of springs mounted in said winding member for counterbalancing the curtain, said springs having their axes eccentric to the axis of the winding member and located in a circle concentric with the axis of the curtain, a gear operably connected with each of said springs and a stationary circular rack engaging said gears adapted to place said springs under increasing tension when the curtain winding member is turned in one direction.

6. The combnation with a curtain and winding member therefor, of a plurality of springs mounted in said winding member for counterbalancing the curtain said springs having their axis eccentric to the axis of the winding member but located in a circle concentric with the axis of the curtain, means for initially adjusting said springs, a gear operably connected with each of said springs, and a stationary circular rack engaging said gears adapted to place said springs under increasing tension when the winding member is turned in one direction.

7. A tension member for a rolling curtain comprising, in combination, a drum on which the curtain is wound and unwound, a shaft therefor, a plurality of springs eccentrically mounted within the drum, shafts for said springs and with which they are respectively connected, and operating means common to said shafts for simultaneously placing said springs under tension when the curtain is unwound.

8. A tension member for a rolling curtain comprising, in combination, a drum on which the curtain is wound and unwound, a shaft therefor, a plurality of springs within the drum, shafts with which said springs are connected having their axes arranged in a circle around the drum, and means common to said shafts for operating said shafts to simultaneously place said springs under tension when the curtain is unwound.

9. A tension and hoisting means for a rolling curtain comprising, in combination, a rotary drum upon which the curtain may be wound, a shaft for said drum affixed thereto, a plurality of springs within the drum, shafts with which said springs are connected, and means causing the rotation of said shafts when the drum is rotated.

10. A tension and hoisting means for a rotary curtain comprising, in combination, a rotary drum upon which the curtain may be wound, a shaft for said drum affixed thereto, a plurality of springs within the drum, shafts with which said springs are connected, spur gears on said shafts, and a stationary rack with which said spur gears engage to cause said shafts to place said springs under tension when the drum is rotated in one direction.

11. A tension and hoisting means for a rolling curtain comprising, in combination, a rotary drum upon which the curtain may be wound, means whereby the drum may be rotated, a plurality of springs within the drum, shafts with which said springs are connected, spur gears on said shafts, and a stationary rack with which said spur gears are engaged to cause the said springs to be placed under tension when the drum is rotated in one direction.

12. A tension and hoisting means for a rolling curtain comprising in combination, a rotary drum upon which the curtain may be wound, a spring within the drum and eccentric to the axis thereof, and means for actuating said spring to place it under tension when the drum is turned in one direction.

13. A tension and hoisting means for a rolling curtain comprising in combination, a rotary drum upon which the curtain may be wound, a plurality of springs within the drum and eccentric to the axis thereof, and means for actuating said springs to place them under tension when the drum is turned in one direction.

14. In means of the kind described, the combination of a fixed frame, a driven shaft journaled in said frame, a drum having heads fixed on said driven shaft, a plurality of rotary shafts mounted in one of said heads, said shafts being located around and in a circle concentric to said driven shaft, a coil spring for each of said shafts connected to the drum and to the shaft, a spur gear on each of said shafts, a stationary gear fixed on the frame to engage all of said gears and means consisting of a large gear driven by a small gear for rotating said driven shaft whereby all of said springs are placed under increasing tension when said driving shaft is rotated in one direction.

15. A counterbalancing mechanism for a curtain winding drum having a fixed supporting frame and a drum turning means, said counterbalancing mechanism including a plurality of spur gears mounted on the drum on axes parallel to but eccentric to the axis of the drum, a coil spring for each of said spur gears within the drum each connected at one end to be wound and unwound by said spur gear and its other end connected with said drum and means for rotating said spur gear when the drum is turned to wind and unwind said springs when the curtain is unwound and wound respectively and means for adjusting the tension of each of said springs independently of the others.

RALPH H. GREEGOR.